Jan. 4, 1966    J. T. GELARDI ETAL    3,227,492
BRUSH TRIMMER
Filed Oct. 2, 1962
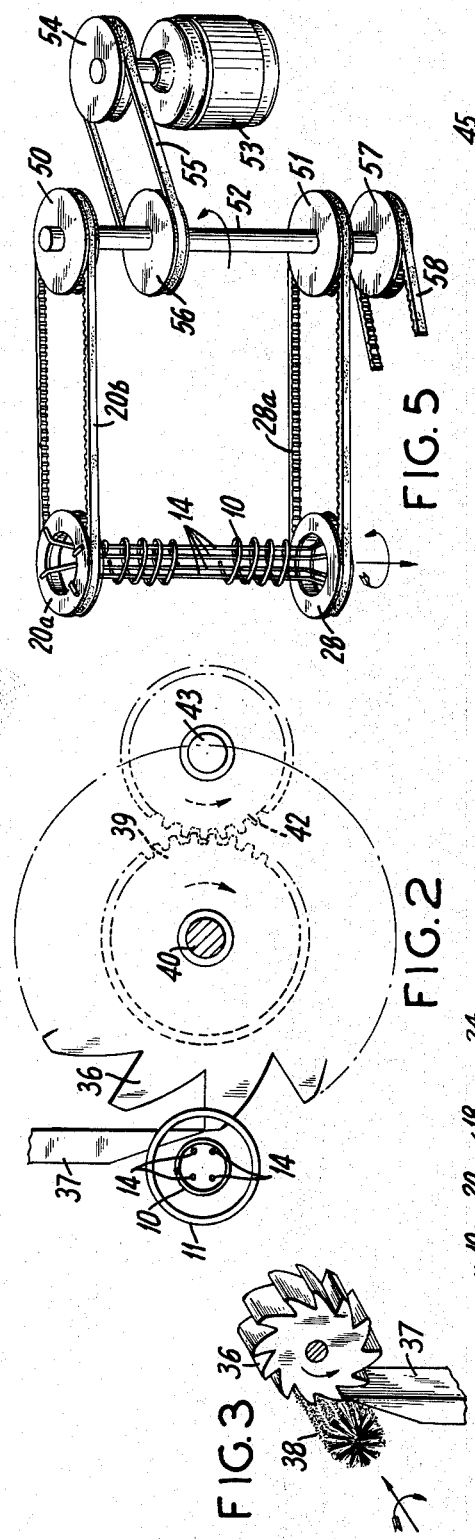
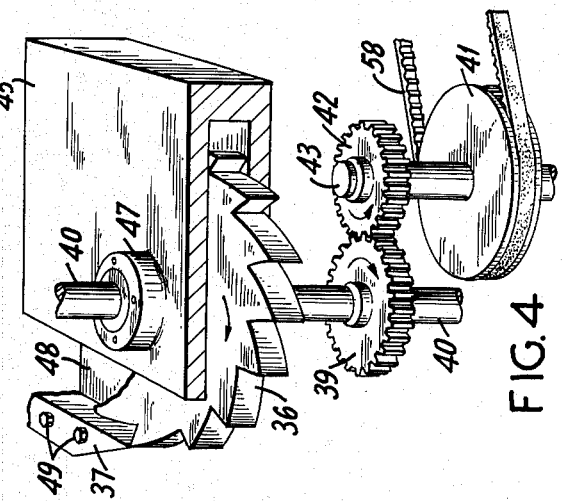
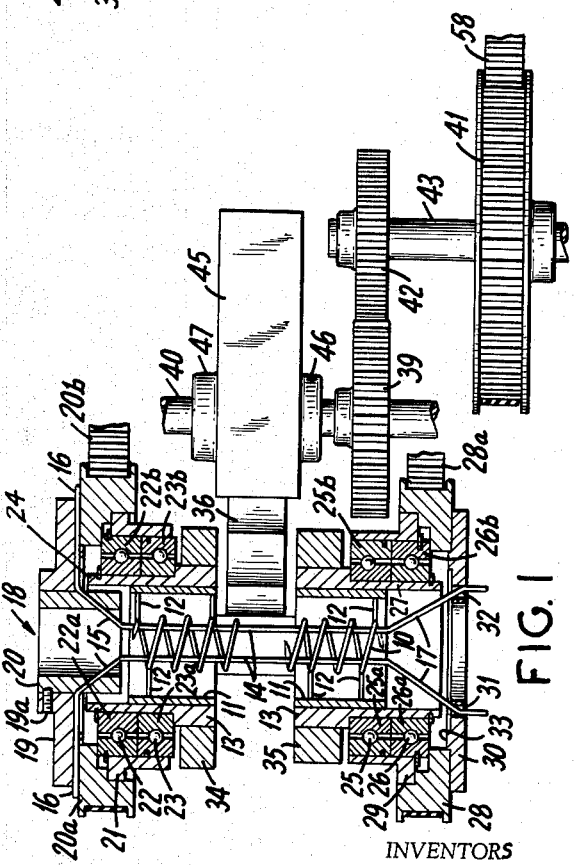
INVENTORS
JOSEPH GELARDI
ANTHONY De COSMO
BY
ATTORNEYS 3,227,492
BRUSH TRIMMER
Joseph T. Gelardi, Yonkers, and Anthony De Cosmo, Portchester, N.Y., assignors to American Technical Machinery Corp., Mount Vernon, N.Y., a corporation of New York
Filed Oct. 2, 1962, Ser. No. 227,949
8 Claims. (Cl. 300—17)

This invention relates to a device for trimming brushes or the like and, in particular, to a device for trimming unlimited lengths of twisted wire brushes of substantially cylindrical shape.

It is known to trim twisted wire brushes utilizing a full length rotary cutter having longitudinally arranged helical blades adapted to trim the surface of a brush similar to a glass cutter. In order to effect trimming, a unit length of the brush element had to be brought to the cutter in a cutting zone free from any obstructions. Because the support of the brush element was necessarily restricted to its ends, the thus-supported brush tended to sag at its middle during trimming, whereby it was difficult to obtain a true cylindrical shape.

A method proposed for overcoming the foregoing difficulties comprised feeding a length of a twisted brush element through a hollow cylindrical brush support and subjecting successive peripheral portions of the brush to trimming as the brush element is moved linearly without rotation through the cylindrical brush support past a pair of diametrically opposed multi-bladed rotary cutters, each located in cutting relationship with a fixed stationary blade and mounted on a circular plate coaxial with the cylindrical brush support and adapted to rotate about the longitudinal axis of the support. Thus, while the multi-bladed cutters rotated about their own axis, they also moved around the periphery of the brush. While the proposed device was a marked improvement over prior trimming devices, the mechanism employed was more complicated and involved moving parts having high rotational inertia. In addition, the support of the brush within the cylindrical container was not as rigid as desired and the supported brush tended to move laterally during the application of trimming forces to the bristles.

Accordingly, it is now an object of the invention to provide an improved brush trimmer which obviates to a large extent the foregoing disadvantages and which in addition is more simple in its construction.

A feature of the invention resides in the fact that an unlimited length of a twisted brush element can be substantially uniformly trimmed along the whole length thereof.

Another feature of the invention resides in the fact that a unit length of the brush subjected to trimming is substantially rigidly or firmly supported along each increment within the unit length, whereby lateral deflection of the brush during trimming is maintained at a minimum and whereby substantially cylindrical brush elements are assured.

A still further feature of the invention resides in the use of a brush feeding element in cooperable association within a brush element support, whereby continuous lengths of brush elements are capable of being fed past a trimmer assembly.

It is thus an object of the invention to provide a trimming device comprising a combined brush feeding and supporting assembly in cooperable association with a brush trimming assembly.

Another object is to provide a trimming device in which the combined brush feeding and supporting assembly is adapted to feed successive lengths of a brush element linearly and rotationally past a trimmer assembly.

These and other features and objects will more clearly appear when taken in conjunction with the following disclosure and the accompanying drawing, wherein:

FIG. 1 shows in elevation a partial section of one embodiment of the invention;

FIG. 2 is a partial plan view of the embodiment shown in FIG. 1 showing the relation of the brush feeding and supporting assembly to the trimming assembly;

FIG. 3 illustrates in perspective the relation of a linearly and rotationally fed brush element to the trimming assembly;

FIG. 4 depicts in perspective the trimming assembly together with the housing therefor; and FIG. 5 illustrates the drive and belt system employed in combination with the brush trimmer.

Stating it broadly, the method aspect of the invention comprises taking a unit length of a longitudinal brush element and supporting the unit length firmly throughout along each successive increment of said length while feeding the brush element linearly and rotationally past a stationary trimmer assembly, preferably, located intermediate the supported unit length. An apparatus embodiment provided by the invention which may be employed in carrying out the foregoing method comprises in combination a brush feeding and supporting assembly comprising a helically generated element having a plurality of spaced rods passing longitudinally therethrough, in which the helical element is adapted to receive and permit the longitudinal passage therethrough of a brush element with its bristles projecting radially outwardly of the helical element. Means for rotating the rods about the longitudinal axis of the helical element is provided to rotate and linearly feed a brush element therethrough via contact with the bristles thereof. To complete the combination, a trimmer assembly is provided located intermediate the ends of the helical element comprising a stationary blade fixed transverse to the longitudinal axis of said helical element and spaced from the surface thereof and a disc-shaped multi-bladed rotary cutter in trimming relationship with the cutting edge of the stationary blade with its axis of rotation parallel to the axis of the helical element. The helical element aids in firmly supporting a unit length of a brush element along each successive increment thereof while it is passing therethrough during trimming, whereby a substantially uniform cylindrical brush element is assured.

Referring now to FIGS. 1 and 2 of the drawing, an apparatus embodiment is shown comprising a partial plan view (FIG. 2) indicating generally in outline the association of the brush feeding and supporting assembly with the trimmer assembly, a more detailed rendition of the related elements being shown in elevation in FIG. 1.

The brush feeding and supporting assembly comprises a stationary helically generated element 10 of wire in the form of a helical screw passing axially through hollow cylindrical body 11 and anchored thereto by a plurality or radially extending struts 12. The cylindrical body 11 is supported by a cylindrically shaped housing column 13 having reduced end portions for supporting ball bearing assemblies to be described later. Passing through the stationary helical screw are four rotatable drive wires 14 (note FIG. 1) having their protruding ends bent at one end at 15 to form radially extending legs 16 anchored as shown and the opposite ends bent at 17 and anchored with a wire drive collar to be described later.

Starting with the top of FIG. 1, the elements associated with the helical screw and the driving rods comprise a rotatable brush orifice 18 formed of a flanged collar 19 with an L-shaped cross section and having an annular brush adapter 20 snugly fitted into the opening of the collar and held in place by set screw 19a passing through the reduced end of the collar. The flange of collar 19 is keyed to pulley 20a adapted to receive a toothed drive belt 20b with the legs 16 of drive wires 14 anchored therebetween.

Pulley 20a is associated with a pair of adjacently arranged ball bearings via annular pulley adaptor housing 21 which in turn is keyed to ball bearings 22 and 23 which are pressed fitted and keyed via inner races 22a and 23a to reduced end portion 24 of stationary cylindrical housing 13. Thus, flanged collar 19 of brush orifice 18 and pulley 20a together with anchored legs 16 of drive wires 14 are rotatably mounted via outer races 22b and 23b of ball bearings 22 and 23.

At the bottom end of the assembly, shown in FIG. 1 a similar rotatable mounting is shown for driving wires 14 comprising ball bearings 25 and 26 pressed fitted and keyed via inner races 25a and 26a to reduced end portion 27 of cylindrical housing 13. Pulley 28 is provided in cooperable relation with said ball bearings via annular pulley adaptor housing 29 keyed to rotatable outer races 25b and 26b. The pulley is driven via a toothed belt 28a. A wire drive collar 30 is fixedly associated with pulley 28 via annular shoulder 33 and having openings 31 and 32 through which bent portions 17 of drive wires 14 project and are anchored in position.

As shown in FIG. 1, pulleys 20a and 28 are equal in size and timed via a pair of simultaneously driven toothed belts 20b and 28a whereby rotating drive wires 14 are maintained in alignment throughout the length of helical screw and apply force uniformly against the bristles of an entering brush element along the unit length thereof as defined by the length of the helical screw firmly supporting the brush portion passing therethrough.

Intermediate the two ends of the helical brush support, a pair of openings are provided (note FIG. 1) traversing stationary housing column 13 and stationary hollow cylindrical body 11 to provide a trimming zone for receiving the trimming assembly. On each side of the openings are a pair of structural annular rings 34 and 35 suitably connected to a frame (not shown) to rigidize that portion of the assembly.

The trimming assembly is of the type depicted generally in FIG. 3 and shown in more structural detail in FIG. 4. It comprises rotary multi-bladed cutter 36 associated in cutting relationship with stationary blade 37. In order to fully appreciable the relation of the cutting assembly to the brush feeding and supporting assembly, a unit length of a brush 38 is shown as it would appear supported by the helical screw shown in FIG. 1 during feeding past the cutter assembly. As the brush is fed linearly through the helical screw it rotates in a direction opposite to the direction of rotation of the multi-bladed rotary cutter and any bristles extending between stationary blade 37 and rotary cutter 36 are sheared off to the desired length as the brush element rotates.

Referring to FIG. 1, one trimming assembly is shown, although two may be employed, one on each side, if desired, in the opposed pair of openings intermediate the two ends of the helical brush support. However, one assembly is sufficient to achieve the results of the invention. Rotary cutter 36 is indicated partially in outline in the plan view of FIG. 2 in association with driven gear 39 mounted on shaft 40 in cooperation with a pulley 41 and gear 42 (note FIG. 1) axially mounted on parallel shaft 43. The stationary blade which is at right angles to the feeding assembly is hidden from view in FIG. 1 but is shown partially in FIG. 2. The cooperation of these elements will be better appreciated by referring to FIGS. 2 and 4 in which the rotary cutter 36 is shown rotatable clockwise via belt-driven toothed pulley 41 through gear 42 meshing with gear 39 on the cutter shaft.

The structural details of the trimmer cutter assembly together with associated gearing is shown in perspective in FIG. 4 considered in the light of FIG. 1. The assembly comprises a trimmer cutter housing 45 for rotary cutter 36 which extends from out of the housing into the trimming zone intermediate the two ends of the helical support as shown in FIG. 1. Shaft 40 on which rotary cutter 36 is axially mounted passes through the housing as shown and is rotatably supported by journals 46 and 47 fixed on opposite sides of the housing. A blade-supporting ledge 48 extends outwardly from one side of the housing to which stationary blade 37 is rigidly attached via bolts 49.

The mechanism for driving the trimmer and for rotating drive wires 14 within the helical screw is shown generally in FIG. 5. Pulleys 20a and 28 are simultaneously driven via non-slip toothed belts 20b and 28a via drive pulleys 50 and 51 mounted on drive shaft 52. The drive shaft is driven by means of motor 53 through driving V-pulley 54, V-belt 55, and driven V-pulley 56 mounted on shaft 52. Another toothed pulley 57 together with belt 58 is provided at the bottom end of the drive shaft for driving toothed pulley 41 of the trimmer cutter assembly for rotating cutter 36. Thus, as drive shaft 52 is driven by the motor, pulleys 20a and 28 are simultaneously driven via belts 20b and 28a together with pulley 41 driven by belt 58.

The various assemblies are supported in the usual manner within a frame, the details of which have been omitted as not essential to the understanding of the invention.

In using the apparatus of the invention, the motor driving the belts is actuated to rotate driving rods 14 within helical screw 10 and to rotate the cutter assembly shaft. A brush element is then fed vertically downward into brush orifice 18 (FIG. 1). As the four driving rods 14 bridge across the bristles of the brush and apply a driving force thereto, the brush is caused to rotate and follow the helical pitch of the screw support. As the brush element traverses the length of the helical screw, the rotating bristles project outwardly between the helical turns and come in contact with the blades of the trimming assembly as shown in FIG. 3. Because each unit length of the brush element is firmly supported by the turns of the helical screw throughout the length of the screw during linear and rotational travel therethrough, a uniform trimming of each segment of the brush is assured regardless of the length of the brush element. It is thus apparent that the novel apparatus may be applied to the trimming of unlimited lengths of brush elements as well as to segmented brush elements.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of cylindrically trimming the periphery of a longitudinal brush having radially extending bristles which comprises, feeding said brush into the central opening of a helical configurated element with the bristles radially extending through the spaces thereof, which element supports firmly a unit length of said brush along each successive increment of said length, and applying a force transversely of said bristles whereby to rotate said brush and cause it to feed linearly and rotationally past a trimmer.

2. A method of cylindrically trimming the periphery of a longitudinal brush having radially extending bristles which comprises, feeding said brush into the opening of a stationary helical configurated element with the bristles radially extending through the spaces thereof, which element supports firmly a unit length of said brush along each successive increment of said length, and applying a force transversely of said bristles whereby to rotate said brush and cause it to feed linearly and rotationally past a trimmer located intermediate of the length of said helical configurated element.

3. In a brush trimmer the combination of a brush feeding and supporting assembly comprising a helically configurated element having a plurality of spaced rods passing longitudinally therethrough, said helical element being adapted to receive and permit the longitudinal passage therethrough of a brush element with its bristles projecting radially outwardly through spaces between the turns of the helical element, means for rotating said rods about the longitudinal axis of said helical element to rotate and linearly feed a brush element therethrough via contact with the bristles thereof, and a trimmer assembly cooperatively associated with said helical element comprising a stationary blade fixed transverse to the longitudinal axis of said helical element and spaced from the surface thereof and a disc-shaped multi-bladed rotary cutter in trimming relationship with the cutting edge of said stationary blade with its axis of rotation parallel to the axis of the helical element.

4. In a brush trimmer the combination of a brush feeding and supporting assembly comprising a stationary helically configurated wire element having a plurality of spaced rods passing longitudinally therethrough, said helical element being adapted to receive and permit the longitudinal passage therethrough of a brush element with its bristles projecting radially outwardly through the spaces between the turns of the helical element, means for rotating said rods about the longitudinal axis of said helical element to rotate and linearly feed a brush element therethrough via contact with the bristles thereof, and a trimmer assembly cooperably associated with said helical element and located intermediate the ends thereof comprising a stationary blade fixed transverse to the longitudinal axis of said helical element and spaced from the peripheral surface thereof and a disc-shaped multi-bladed rotary cutter in trimming relationship with the cutting edge of said stationary blade with its axis of rotation parallel to the axis of the helical element.

5. A brush trimmer including in combination, a brush feeding and supporting assembly comprising a hollow cylinder having a stationary helically configurated wire element supported coaxially within said hollow cylinder adapted to receive and permit the passage therethrough of a brush element with its bristles projecting radially through the spaces of said helical element into a trimming zone, a plurality of spaced rods passing longitudinally through said helical element, means for rotating said rods about the longitudinal axis of said helical element to rotate a brush element therein via contact with the bristles thereof, and a trimmer assembly cooperably associated with trimming zone of said brush feeding and supporting assembly comprising a stationary blade fixed transverse to the longitudinal axis of said helical element and spaced from the surface thereof and a disc-shaped multibladed rotary cutter in trimming relationship with the cutting edge of said stationary blade with its axis of rotation parallel to the longitudinal axis of the helical element.

6. A brush trimmer including in combination, a brush feeding and supporting assembly comprising a hollow cylinder having stationary helically configurated wire element supported coaxially within said hollow cylinder adapted to receive and permit the passage therethrough of a brush element with its bristles projecting radially through the spaces of said helical element into a trimming zone, a plurality of spaced rods passing longitudinally through said helical element, means for rotating said rods about the longitudinal axis of said helical element to rotate a brush element therein via contact with the bristles thereof, and a trimmer assembly located intermediate the ends of said hollow cylinder and projecting within said cylinder into said trimming zone comprising a stationary blade fixed transverse to the longitudinal axis of said helical element and spaced from the surface thereof and a disc-shaped multi-bladed rotary cutter in trimming relationship with the cutting edge of said stationary blade with its axis of rotation parallel to the longitudinal axis of the helical element.

7. In a brush trimmer the combination of a brush feeding and supporting assembly comprising a helically configurated element for receiving and permitting the passage therethrough of a longitudinal brush with its bristles projecting radially outwardly through spaces between the turns of the helical element, means for rotating said brush about its longitudinal axis whereby to feed said brush linearly through said helical element, and a trimmer assembly cooperatively associated with said helical element for trimming the bristles projecting radially outwardly therefrom.

8. In a brush trimmer the combination of a brush feeding and supporting assembly comprising a helically configurated element for receiving and permitting the passage therethrough of a brush element with its bristles projecting radially outwardly through spaces between the turns of the helical element, means for applying a force transversely of said bristles to rotate and linearly feed said brush through said helical element, and a trimmer assembly cooperatively associated with said helical element for trimming the bristles projecting radially outwardly therefrom.

References Cited by the Examiner

UNITED STATES PATENTS

| | | | |
|---|---|---|---|
| 1,796,824 | 3/1931 | Brown | 300—17 |
| 3,095,240 | 6/1963 | Marks | 300—17 |

FOREIGN PATENTS 11,710    1888    Great Britain.

FRANK E. BAILEY, *Primary Examiner.*